Oct. 8, 1940.     J. F. McNALLY ET AL     2,217,317
AUTOMOBILE JACKING DEVICE
Filed March 24, 1939
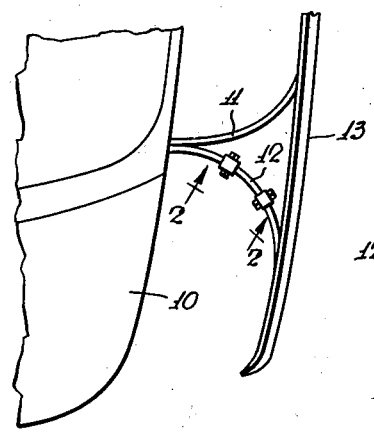
Fig.1.
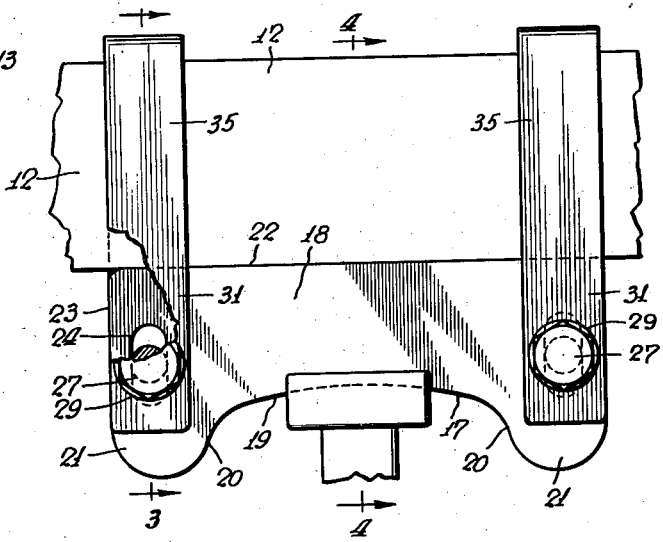
Fig.2.
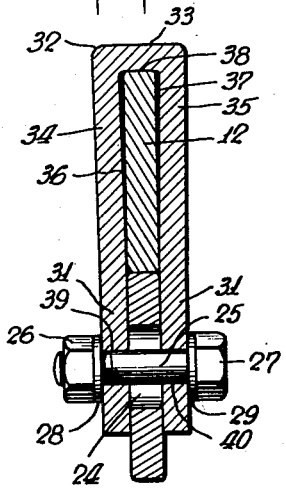
Fig.3.
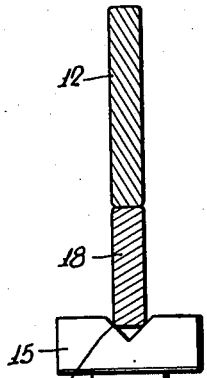
Fig.4.
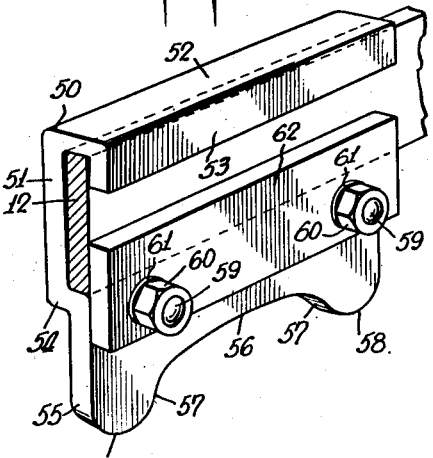
Fig.5.
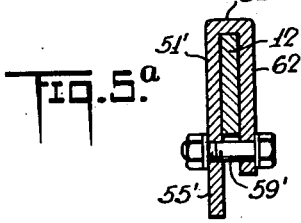
Fig.5ª.
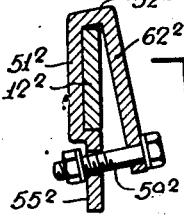
Fig.5ᵇ.
INVENTORS
Joseph F. McNally
Jeremiah F. Toomey
BY Harry Price
ATTORNEY Patented Oct. 8, 1940

2,217,317

UNITED STATES PATENT OFFICE 2,217,317

AUTOMOBILE JACKING DEVICE

Joseph F. McNally, Brooklyn, and Jeremiah F. Toomey, Bronx, N. Y.

Application March 24, 1939, Serial No. 263,832

10 Claims. (Cl. 254—133)

The present invention relates to an automobile jacking device and it particularly relates to an automobile jacking device of the type designed to be associated with the bumper or bumper support construction of an automotive vehicle.

With the usual type of bumper jacks, there is a groove or hook provided on the top of the jack which is designed to engage the bumper itself or the bars by which said bumper is attached to the chassis frame or body of the car.

However, as a general rule, the jacking up of the car substantially changes the amount and direction of downward force which must be carried by the jack, with the result that there is a tendency for the car to slip laterally upon the jack or to slip off the jack or for the jack to be thrown upon its side, with possibilities of injury to the persons working on the car and of damage to the car construction itself.

It is not particularly desirable to attach to automotive vehicles expensive attachments which require considerable manipulation or which require special jack constructions to eliminate these possibilities, and it is among the objects of the present invention to provide an improved attachment which may be readily applied to any part of the bumper construction of an automotive vehicle, whether it be the main bumper structure or the bumper support bars extending rearwardly or forwardly to the chassis, with assurance that the jack will securely hold the car in jacked-up or elevated position without undue danger of slipping off the jack and without tendency of the jack to be thrown out of position or upon its side with release of the automotive vehicle.

A further object of the present invention is to provide a simple, inexpensive, readily attachable device for automotive vehicles, which will enable such vehicles to be more easily jacked up with the usual type of bumper jack now supplied with automobiles.

Still further objects and advantages will appear in more detailed description set forth below, it being understood, however, that this more detailed description is given by way of illustration and explanation only, and not by way of limitation, since various changes therein may be made by those skilled in the art without departing from the scope and spirit of the present invention.

In accomplishing the objects of the present invention it has been found most suitable, according to one embodiment of the present invention, to provide a member to engage the support bar of the bumper construction. This member may take the form of a partial or total closure and in one form shown takes the form of a double U-construction, which is designed to engage one of the bumper support bars and to hold in position thereon a suitable contact member to engage the upper portion of the jack.

The contact member desirably takes the form of a plate having a curved elongated recess, concave downwardly, which recess is designed to engage the upper portion of the jack.

In a less preferred construction, the engaging member and recessed plate may be made integral.

Referring to the drawing which illustrates several of the various possible embodiments of the present invention, but to which the present invention is by no means restricted, since the drawing is merely by way of illustration and not by way of limitation:

Fig. 1 diagrammatically illustrates the manner of attachment of the device to the bumper bar of an automotive vehicle, Fig. 2 is an elevational view upon the line 2—2 of Fig. 1 upon an enlarged scale as compared to Fig. 1, Figs. 3 and 4 are respectively transverse sectional views upon the lines 3—3 and 4—4 of Fig. 2, Fig. 5 is a perspective view of an alternative form of device attached to the bumper bar and with the bumper bar broken away to more clearly show the construction.

Figs. 5a and 5b are transverse sectional views similar to Fig. 3, and upon a smaller scale as compared to Fig. 3 of alternative constructions.

Referring particularly to Fig. 1, the automobile body 10 is provided with the outstanding bumper support bars 11 and 12 which support the bumper construction 13.

The bumper 13 may consist of a relatively wide bar of metal, with a rounded face of the type widely employed.

The support bars 11 and 12, which may be of many different constructions other than that shown, may consist of relatively smaller strips of metal of substantially rectangular cross section, as for example best shown at 12 in Figs. 2 and 3 upon an enlarged scale.

There is indicated in Figs. 2 and 3, the upper end 16 of a standard jack device having a groove 14 in its head 15. To contact and be received in the groove 14 of the head 15 of the jack 16, is the curved bottom 19 of the recess 17 of the plate 18.

The recess is relatively shallow and has a slightly curved bottom portion 19 and sharply curved side portions 20, which extend downwardly to the projections 21. The top of the plate at 22 is designed to abut the bottom edge of the bar 12. The sides of the plate are straight, as indicated at 23.

The plate 18 is provided with the laterally positioned vertical slots 24, which receive the bolts 25 carrying the nuts 26 and the heads 27 upon their ends. These nuts 26 and heads 27 may be drawn up against the washers 28 and 29, as shown, to clamp the outer portions 30 and 31 of the U-shaped members 32. The members 32 have the bases 33 and the side legs 34 and 35.

As shown the inside faces 36, 37 and 38 of the U-shaped members 32 embrace the bar 12, and if desired the legs 34 and 35 may be caused to converge toward one another so as to be more readily fitted upon the bumper bar 12.

The outer ends 30 and 31, with the legs 34 and 35, have the bolt holes 39 and 40 which receive the bolt 25.

The device consisting of the plate 18 and the two U-shaped members 32 and the bolts 25 may be readily placed upon the bumper bars 11 and 12 at either the front or back of the car when required, or may be left permanently in position, since they are so small as not to disfigure the car and so that they will be concealed by the outside bumper element 13.

In any case the assembly may be readily made by placing the U-members 32 upon the bumper bar 12, then inserting the plate 18 and finally inserting the bolts 25 and attaching the nuts 26. Then the jack is placed below the bumper bar so that the recess 19 of the plate 18 is received in the groove or recess 14 of the head of the jack 15. The plate 18, together with the U-members 32 and the head 15 of the jack 16 will automatically adjust themselves with the head member 15 sliding laterally and finally coming in contact with one of the sides 20 of the recess 17.

When this occurs the jack is in stable position and will firmly support the car without danger of the car slipping laterally, forwardly or backwardly or falling off the jack.

It is thus evident that the device consisting of the elements 18, 32 and 25 will assure greater safety in handling of a car and aid in the jacking up of a car.

Referring to the modification of Fig. 5, the element 50 may be made integral of the full width desired or it may be made in two sections, as are the members 32 of the device of Figs. 2 and 3.

As shown it has a back wall 51, a top wall 52, a downwardly extending hook member 53, a forwardly projecting member 54 and a downwardly projecting member 55. The member 55 is provided with the shallow recess 56 having the sharp side portions 57 and terminates in the depending portions 58. The plate portion 55 is provided with holes (not shown) to receive the bolts 59, which bolts 59 receive the nuts 60 and washers 61.

The nuts 60 are designed to hold the plate 62, through which they project, in clamped position against the bumper bar 12.

In attachment the member 53 forming a hook may be hooked upon the bumper bar, the entire structure 50 preferably being curved or straight to conform to the curvature or to the straightness of the bumper bars 11 and 12.

After hooking of the element 50 in position on the bar, the plate 62 may be readily attached by the bolts 59 and the jack head 15 may be applied in the manner already described and shown in connection with Figs. 2 and 3.

In Figs. 5a and 5b are shown alternative constructions similar to the constructions of Figs. 1 to 4 and Fig. 5, in which alternative constructions the plate 18 and the U-members 35 of Fig. 2 or the structure 50 and the plate 62 of Fig. 5 are made in one piece.

Correspondingly functioning parts in the constructions of Figs. 5a and 5b have the same numerals as the same parts in Fig. 5, except that they are respectively primed or provided with a superior $^2$.

In Fig. 5a the recessed plate 55' extends directly down from the side member 51'. The bolts 59' contact with and take up the pressure against the bumper bar 12'.

In respect to Fig. 5b, the plate 62 of Fig. 5 has been made integral with the extension 63, as indicated at $62^2$ in Fig. 5b and the plate 62 has been separated fully from the recessed extension $55^2$ to permit insertion of the bumper bar $12^2$.

As many changes could be made in the apparatus and devices, and many apparently widely different embodiments of this invention could be made without departing from the scope thereof, it is intended that all matter contained in the above description shall be interpreted as illustrative and not in a limiting sense.

What is claimed is:

1. An automobile jacking device to be attached to a bumper bar and to receive a jack and to permit lateral adjustment of the jack and to permit the car to move laterally or longitudinally to a stable position without falling off the jack, said device being designed to be utilized upon a car of the type having a bumper construction with bumper bars extending between the bumper and the car body or chassis frame and with a jack having a head with an elongated recess, said device comprising means to engage the bumper bar, a vertical plate extending longitudinally along the bumper bar and attached to said engaging means, said plate having a recess in its lower edge, said recess being concave downwardly and having relatively sharply curved sides and a relatively flat curved central portion, which flat central portion is designed to cooperate with the recess in the automobile jack, the upper edge of said plate abutting and lying substantially flush with the lower edge of the bumper bar with which said device is engaged.

2. An automobile jacking device to be attached to a bumper bar and to receive a jack and to permit lateral adjustment of the jack and to permit the car to move laterally or longitudinally to a stable position without falling off the jack, said device being designed to be utilized upon a car of the type having a bumper construction with bumper bars extending between the bumper and the car body or chassis frame and with a jack having a head with an elongated recess, said device comprising two U-shaped members to be placed in inverted position upon a bumper bar and a recessed plate to be connected to the lower ends of said U-shaped members, the recess of said plate being designed to fit into the groove of said jack.

3. An automobile jacking device to be attached to a bumper bar and to receive a jack and to permit lateral adjustment of the jack and to permit the car to move laterally or longitudinally to a stable position without falling off the jack, said device being designed to be utilized upon a car of the type having a bumper construction with bumper bars extending between the bumper and the car body or chassis frame and with a jack having a head with an elongated recess, said device comprising a hook member to engage a bumper bar and a plate to be bolted to said hook member to hold said hook member upon said bumper bar, said hook being provided with a downwardly projecting recessed plate extension.

4. An automobile jacking device to be attached to a bumper bar and to receive a jack and to permit lateral adjustment of the jack and to permit the car to move laterally or longitudinally to a stable position without falling off the jack, said device being designed to be utilized upon a car of the type having a bumper construction with bumper bars extending between the bumper and the car body or chassis frame and with a jacking having a head with an elongated recess, said device comprising two U-shaped members, a plate and two bolts, said U-shaped members being inverted and positioned upon the bumper bar and projecting below the bumper bar, said plate being positioned between the projecting portions of the U-shaped members below said bumper bar and bolts to connect said plate to the projecting portions, the upper edge of said plate abutting the bottom of said bumper bar.

5. An automobile jacking device to be attached to a bumper bar and to receive a jack and to permit lateral adjustment of the jack and to permit the car to move laterally or longitudinally to a stable position without falling off the jack, said device being designed to be utilized upon a car of the type having a bumper construction with bumper bars extending between the bumper and the car body or chassis frame and to cooperate with a jack having a head with an elongated recess, said device comprising U-shaped members to engage the bumper bar, a plate member to be positioned below the bumper bar and to contact the bottom of the bumper bar and bolt attachments to hold said U-shaped members and plate upon the bumper bar.

6. An automobile jacking device to be attached to a bumper bar and to receive a jack and to permit lateral adjustment of the jack and to permit the car to move laterally or longitudinally to a stable position without falling off the jack, said device being designed to be utilized upon a car of the type having a bumper construction with bumper bars extending between the bumper and the car body or chassis frame and to cooperate with a jack having a head with an elongated recess, said device comprising U-shaped members to engage the bumper bar, a plate member to be positioned below the bumper bar and to contact the bottom of the bumper bar and bolt attachments to hold said U-shaped members and plate upon the bumper bar, the lower edge of said plate being recessed concavely downwardly and the middle portion of said recess being designed to be received in the groove of said jack.

7. A jacking-up device for attachment to automobile bumper bars and to cooperate with automobile jacks, comprising U-shaped members to engage the bumper bar, a plate member to engage the jack and to contact the lower side of the bumper bar and bolt means to connect the plate and U-shaped members to the bumper bar.

8. An automobile jacking device comprising two U-shaped members to engage the bumper bar of an automobile, a plate member to contact the bottom of the bumper bar and the top of an automobile jack at its upper and lower edges respectively, and means to hold said U-shaped members and plate in engagement with the bumper bar.

9. An automobile jacking device to be attached to a bumper bar and to receive a jack and to permit lateral adjustment of the jack and to permit the car to move laterally or longitudinally to a stable position without falling off the jack, said device being designed to be utilized upon a car of the type having a bumper construction with bumper bars extending between the bumper and the car body or chassis frame and with a jack having a head with an elongated recess, said device comprising means to engage the bumper bar, a vertical plate extending longitudinally along the bumper bar and extending below the bumper bar attached to said engaging means, said plate having a recess in its lower edge, said recess being concave downwardly and having relatively sharply curved sides and a relatively flat curved central portion, which flat central portion is designed to cooperate with the recess in the automobile jack, the upper edge of said plate abutting and lying substantially flush with the lower edge of the bumper bar with which said device is engaged.

10. An automobile jacking device to be attached to a bumper bar and to receive a jack and to permit lateral adjustment of the jack and to permit the car to move laterally or longitudinally to a stable position without falling off the jack, said device being designed to be utilized upon a car of the type having a bumper construction with bumper bars extending between the bumper and the car body or chassis frame and to cooperate with a jack having a head with an elongated recess, said device comprising U-shaped members to engage the bumper bar, a plate member to be positioned below the bumper bar and to contact the bottom of the bumper bar and bolt attachments to hold said U-shaped members and plate upon the bumper bar, said plate member having vertical slots receiving said bolt attachments, the lower edge of said plate being recessed concavely downwardly and the middle portion of said recess being designed to be received in the groove of said jack.

JOSEPH F. McNALLY.
JEREMIAH F. TOOMEY.